Aug. 20, 1963    M. C. JUNGER    3,100,994
PULSE-ECHO GAUGING SYSTEM
Filed Aug. 5, 1960    2 Sheets-Sheet 1

INVENTOR.
MIGUEL C. JUNGER
BY
ATTORNEY

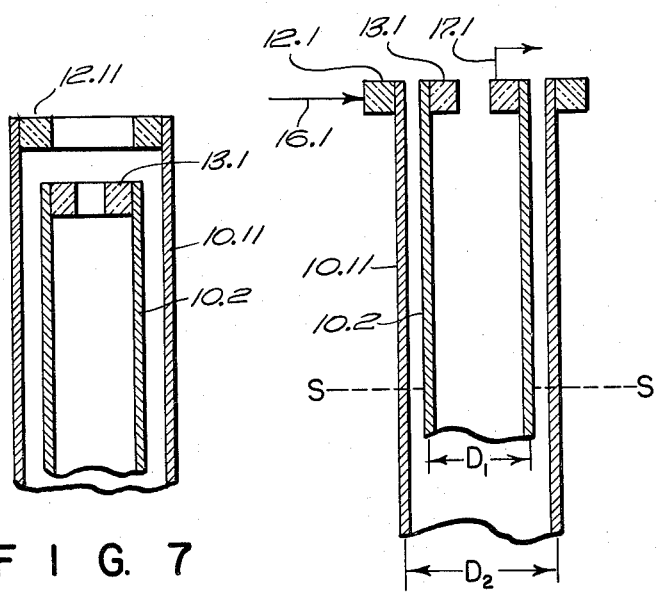

United States Patent Office 3,100,994
Patented Aug. 20, 1963

3,100,994
PULSE-ECHO GAUGING SYSTEM
Miguel C. Junger, Cambridge, Mass., assignor to Acoustica Associates, Inc., Los Angeles, Calif., a corporation of New York
Filed Aug. 5, 1960, Ser. No. 47,877
4 Claims. (Cl. 73—290)

This invention relates in general to location of the interface between a liquid and a gas, such as a surface of a body of a liquid having air or other gas above it, or between two liquids, by echo-ranging the surface or interface by means of elastic waves propagating in an elongated wave conductor. More particularly, the invention relates to improvements in such wave conductors and in the methods and means to use them.

In prior-existing systems for echo-ranging such an interface, as exemplified by liquid-level gauges, a vertically disposed solid wave conductor penetrating the liquid surface is provided, usually at its top, with an electro-mechanical transducer to introduce elastic wave pulses into the conductor. When these waves reach the liquid surface, the radiation impedance presented by the liquid to the radial component of motion associated with the wave motion results in a partial reflection of the incident pulse. More precisely, the change in radial impedance which causes the partial reflection of elastic waves in an elongated wave conductor at the liquid surface or interface penetrated by the conductor does not attain its full value until the wave is approximately one-quarter wavelength (referred to the velocity of the wave in the liquid) below or within the liquid surface or interface. The time interval between the emission (by the transducer) of the original pulse and perception of its echo due to such reflection is used as a measure of the distance from the transducer to the liquid surface.

In such prior systems, the mode of wave energy customarily used is compressional. Compressional waves travel at a higher rate of speed (in a given wave conductor) than other wave modes. A disadvantage of the use of compressive waves in a rod or a tube is that the axial component of motion predominates, the radial component being associated entirely with the Poisson effect, and being accordingly a minor component of the total available elastic wave energy. If elastic waves of a torsional mode are used, these are characterized by predominantly circumferential displacements, which also couple inefficiently with a liquid.

If we define the "target strength" of a liquid surface or interface as the ratio of the quantity of elastic wave energy reflected at the surface or interface to the total quantity of elastic wave energy incident at the surface or interface, it can then be said that the target strength of the liquid surface or interface is small for compressional or torsional waves in the wave conductor. "Target strength" as so defined, can also be expressed in terms of the ratio of the characteristic impedance $(\rho C)_{liquid}$ of the liquid (of which the surface or interface is being supervised from a point outside the body of said liquid) to the characteristic impedance of the wave conductor in the vibrational mode $(\rho C)_{mode}$; the larger this ratio, the larger the target strength.

It is a general object of the present invention to provide a system of the aforementioned general type which will achieve a larger target strength of the liquid surface or interface by maximizing the coupling between the wave conductor surface and the liquid. Specific objects of the invention are to maximize the coupling between the wave conductor surface and the liquid by using a mode of wave propagation characterized by predominantly radial, rather than axial or circumferential displacements, and by using a wave conductor having a low acoustic impedance, i.e., one employing a mode of propagation displaying a relatively small phase velocity, and embodying a small weight per unit area of wave conductor surface in contact with the liquid, so that the ratio of the characteristic impedance of the liquid to the characteristic impedance of the mode is increased.

Another object of the invention is to achieve a favorable, i.e., numerically large, factor of proportionality between (a) the distance from the reference level to the liquid level location, and (b) the elastic (or stress) wave travel time.

This factor of proportionality is governed by the phase velocity of the elastic waves in the mode of propagation used for echo-ranging at the operating frequency. This object may therefore be achieved by selecting a mode of propagation having an inherently low phase velocity. A further object is to achieve such a factor of proportionality which can be adjusted independently of the frequency of operation.

A further object of the invention is to reduce the number of stress cycles required to be contained in any one pulse of elastic wave energy employed. Additional objects are to achieve all of the foregoing objects and features in a structure which is relatively simple to design and construct, can be realized with readily available and desirable material, and presents no unusual complexity in its installation and use.

The foregoing objects are achieved according to the invention by using a tubular wave conductor, preferably a thin cylindrical shell driven radially at a frequency near its axially symmetrical "ring" mode resonance frequency. This frequency is represented by the expression $$f = \frac{\sqrt{2}C_0}{\pi D} \qquad \text{(Relation 1)}$$

where:
"$f$" is the frequency, in cycles per second;
"$C_0$" is the bar velocity $$\sqrt{\frac{E}{\rho}}$$

at which compressional waves propagate in the wave conductor; and
"$D$" is the mean diameter of the shell.

Relation 1 assumes that the thickness of the shell wall is very small (of the order of 5 percent) compared to the mean diameter $D$. In the expression, $$\sqrt{\frac{E}{\rho}}$$

"$E$" is Young's modulus for the shell material, and "$\rho$" is the density of the shell material.

At the frequency, $f$, given by Relation 1, axial propagation of the stress waves is flexural in nature corresponding to an essentially radial ring type, or mode, of vibration. The cylindrical shell can be considered as a series of axially arrayed rings undergoing radial axially symmetrical vibrations. These rings are loosely coupled by the thin shell wall. The natural frequency, $f$, and essentially radial character of the wave motion are associated with the dynamic properties of these ring elements. The phase velocity of the wave motion is determined by the flexural coupling through the shell wall between adjoining ring elements. The radial component of motion is considerably larger than the axial component, as contrasted with compressional or torsional waves, and a higher target strength of a given liquid surface or interface is achieved. The phase velocity of the wave motion of this axially symmetrical radial or "ring" mode of vibration can be adjusted without changing the mean diameter "D" of the tubular shell wave conductor by altering the thickness "t" of the shell wall, as is apparent from the following relation, according to which the ratio of the phase velocity "$C_z$" to the bar velocity "$C_0$" varies approximately as follows at the frequency of ring resonance $$\frac{C_z}{C_0} = \frac{1.074}{(1-\nu^2)^{1/4}}\sqrt{\frac{t}{D}} \qquad \text{(Relation 2)}$$

where: "$t$" is the thickness of the shell wall. Like Relation 1, Relation 2, is true for very thin shells. It is thus possible, using a tubular wave conductor driven radially according to the invention, to select a mean diameter "D" corresponding to the desired frequency of operation according to Relation 1, and then to adjust the ratio "$t/D$" to obtain the desired phase velocity according to Relation 2. Thus, in the above-mentioned ratio $$(\rho C)_{water}/(\rho C)_{mode}$$

$C_z$ is the phase velocity in "$(\rho C)_{mode}$," and can be reduced to alter the ratio in the direction of unity.

The tubular wave conductor is acoustically coupled with an electromechanical transducer of a design which is suitable for generating and responding to radial vibrations. For example, a disc or a ring of one of the well-known electrostrictive polycrystalline ceramic materials, such as barium titanate or lead zirconium titanate, may be used. If desired, two transducers, or two wave conductors, each with a separate transducer, one for transmitting and one for receiving, may be used, as is known in the art of echo-ranging. Electrical circuit components for generating pulses of a suitable frequency and duty cycle, and receiving and indicating echo information, are according to the known art of echo-ranging.

According to another feature of the invention, if it is desired to measure or supervise the volume of a liquid in a tank of variable cross section, the wall thickness "$t$" can be varied with respect to axial position along the wave conductor to adjust the phase velocity with respect to the changing tank cross section, thereby eliminating the need for introducing a correction factor in the system to obtain volume information directly on simple (e.g., linear) indicating instruments. Preferably, such variation is gradual, to avoid unwanted reflections of wave energy at a discontinuity.

The foregoing and other objects and features of the invention are explained more fully in the following description of certain illustrative embodiments thereof. This description refers to the accompanying drawings, wherein:

FIG. 6 is a partial vertical section of another embodiment of the invention; and FIG. 7 is a modification of FIG. 6.

Figure 1:
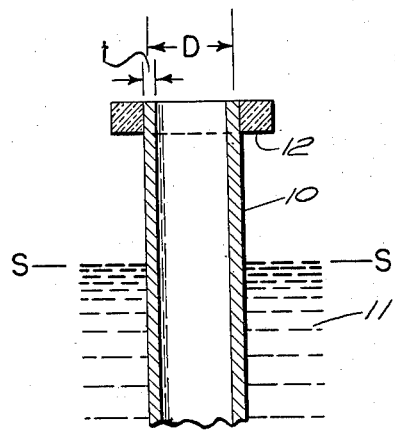
FIG. 1 is a partial vertical section showing a tubular wave conductor coupled at one end to a ring-shaped electromechanical transducer.

Referring now to FIG. 1, a vertically disposed tubular wave conductor 10 of mean diameter D and wall thickness $t$ penetrates through the top surface S—S of and into a body of liquid 11. A ring-shaped electromechanical transducer 12 is fitted to the top of the tube 10 and acoustically coupled thereto. The transducer 12 is intended to be excited in a radially vibrating mode. No specific means of achieving such excitation is shown, inasmuch as such means are well known to the art. The natural frequency of radial vibration of the transducer 12 is preferably chosen to be near the frequency of the axially symmetrical ring mode of the tube 10. The mean diameter D is chosen to adjust the operating "ring" mode frequency of the tube 10 to fall within a desired frequency range, according to Relation 1. The ratio of wall thickness $t$ to diameter D ($t/D$) is chosen according to Relation 2 to provide the desired phase velocity of "ring" mode vibration.

Figure 2:
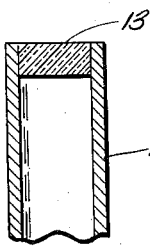
FIG. 2 is a partial vertical section showing a tubular wave conductor coupled to a disc-shaped electromechanical transducer.

The ring-shaped transducer 12 can also be located inside the tubular shell 10 (not shown) in which case the transducer would have an outer diameter equal or closely equal to the inner diameter of the tube 10. Alternatively, a disc-shaped transducer 13, shown in FIG. 2, can be disposed inside the wave conductor tube 10, at or near one end thereof and acoustically coupled thereto, to excite radial stress waves in the tube. The techniques of making and operating radially vibrating disc transducers, of barium titanate for example, are well known, and are therefore not illustrated.

The transducer 12 can be made of any suitable electromechanical transducer material or combination of materials. Radially vibrating magnetostrictive rings with toroidal exciting coils (not shown) and radially vibrating barium titanate rings and discs, are but a few well-known examples. If barium titanate is chosen, the ring transducer form illustrated in FIG. 1, but located inside the tube 10, lends itself particularly well for the purpose of driving a tube 10 made of steel or aluminum, since both the transducer ring and the tubular shell can then easily be made to resonate radially at approximately the same frequency, namely, the frequency given by Relation 1. This conclusion flows from the fact that the ring-resonant frequency of such a transducer is given by the expression $$f = \frac{C_0}{\pi D} \qquad \text{(Relation 3)}$$

where:

"$C_0$" is now the bar velocity of the transducer material; and

"D" is the mean diameter of the transducer ring.

If the transducer material has approximately the same bar velocity as the shell material, comparison of Relations 1 and 3 shows that the same ring resonance frequency can exist if D for the ring transducer is smaller than D for the tubular shell; thus a resonant condition requires that the transducer be located inside the shell rather than outside. If a ring-shaped barium titanate transducer is used in conjunction with a steel or aluminum shell, the bar velocity of the transducer material is slightly smaller than that of the shell material, so that the need to use a transducer ring of smaller mean diameter than that of the shell is even stronger, to achieve a condition of resonance between the transducer and the shell. As will hereinafter be explained, it is preferable to select aluminum for the tube 10 material, because of its lower density (as compared, for example, with steel), which leads to higher target strength of the liquid surface S—S.

Figure 5:
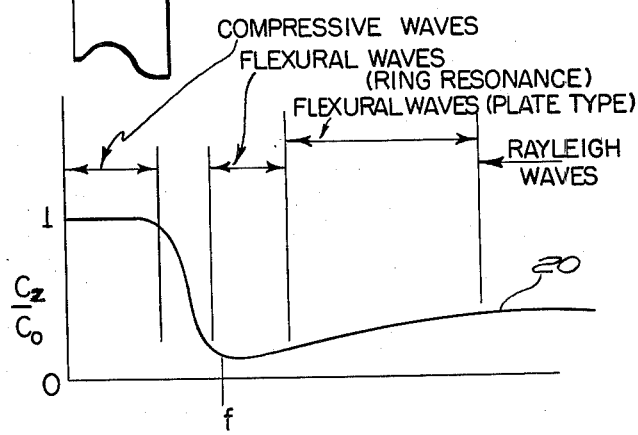
FIG. 5 is a graph useful in explaining the operation of the invention.

The manner in which the wave conductors according to the invention achieve the objects and advantages of the invention is explained with the aid of FIG. 5. The curve 20 of FIG. 5 is a schematic dispersion curve of the lowest axially symmetrical mode in cylindrical shells. At the frequency, $f$, given by Relation 1, the wave motion embodied in this dispersion curve corresponds to an essentially radial ring type vibration of various portions of the shell, as explained above. At lower frequencies the wave motion has the characteristics of a compressive wave propagating with the bar velocity $C_0$, and embodying mostly axial displacements. The phase velocities $C_z$ for frequencies above these lower frequencies are smaller than $C_0$; the minimum phase velocity $C_z$ coincides with the ring-mode resonance frequency, given in Relation 1.

According to Relation 2, the ratio $C_z/C_0$ is proportional to the square root of $t/D$, the thickness to diameter ratio of the tubular shell 10, and if $t/D$ is made smaller the ratio $C_z/C_0$ is also made smaller. Thus is achieved a numerically large factor of proportionality between (a) the distance from the reference level (transducer 12) to the liquid level location (S—S), and (b) the stress wave travel time.

The dispersion curve 20 of FIG. 5 also illustrates how to achieve the object of reducing the number of stress cycles per pulse. Since the minimum value of the phase velocity $C_z$ coincides with the main frequency component (and thus with the predominating "ring" mode vibration), the main frequency component of a pulse is easily distinguished from the secondary frequency components of the pulse, which propagate at higher phase velocity $C_z$. The echoes from the liquid surface associated with these secondary, more rapidly propagated, frequency components not only arrive first but also are of much smaller amplitude than the echo corresponding to the predominant ring mode, or main frequency, component, since:

(a) the coupling between the fluid 11 and the radial wave motion in the wave conductor is strongest at the main frequency, $f$, resulting in a maximum liquid surface target strength at that frequency; and (b) the driving impedance presented by the wave conductor 10 to the transducer 12 is best matched at the frequency of the main component.

Thus, even though many secondary frequency components may be present in a short pulse (one having a small number of stress cycles) they are less objectionable when "ring" mode vibration at or near ring resonance is used than when other modes of propagation are used, since in the former case the biggest component of the pulse always arrives last.

It will thus be appreciated that the objects of the invention are achieved, and its novel features are all afforded, simultaneously by the structural features of the combination of a tubular shell wave conductor and a radially vibratory electromechanical transducer acoustically coupled thereto to interchange ring-mode vibrations therewith for echo ranging through the conductor to a liquid surface or interface.

Figure 3:
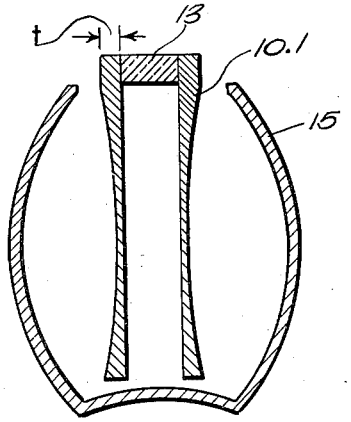
FIG. 3 is a modification of FIG. 1 for liquid volume supervision.

FIG. 3 shows in vertical section a tank 15 having curved walls, and therefore a nonuniform cross section in the vertical direction, for holding a liquid (not shown). A tubular wave conductor 10.1 is vertically disposed in the tank, extending from outside the top to near the bottom thereof. A radially vibratory electromechanical transducer 13 is provided acoustically coupled to the wave conductor as in FIG. 2. The wall thickness ($t$) of the wave conductor 10.1 is nonuniform along the vertical axis of the wave conductor, being thinner where the tank cross section is wider, and vice versa. This is done to reduce the phase velocity of the stress wave in the wave conductor in proportion to the increase of volume of liquid in the tank for each unit for distance along the axis of the wave conductor, so that equal units of travel time of the stress wave will automatically measure equal volumes of liquid (or empty space) in the tank. Referring again to Relation 2, reducing the ratio $t/D$ reduces the ratio $C_z/C_0$, and hence the phase velocity $C_z$ of the radial stress wave.

FIG. 3 illustrates the gradual change of wall thickness $t$ by gradually reducing the outer diameter of the wave conductor 10.1. While this may be the easiest technique to use in practice, since it is simple to turn down the outer surface of a tube in a lathe, for example, it is possible also to vary the inner diameter of the wave conductor 10.1 or both the inner and outer diameters, if desired. Preferably, the change in thickness is gradual, to avoid creating a wave reflecting discontinuity.

Figure 4:
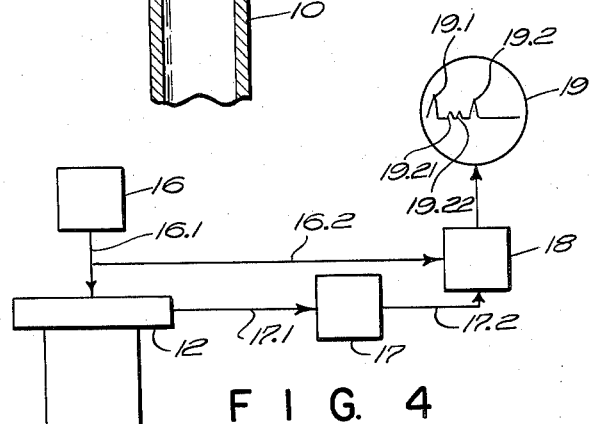
FIG. 4 is a schematic diagram showing a typical echo-ranging system incorporating a wave conductor and transducer according to FIG. 1.

FIG. 4 shows a generator 16 of electric pulse energy at a suitable frequency from driving the transducer 12 in the desired radial or "ring" mode at or near the frequency $f$ given by Relation 1. The generator is connected to the transducer via a suitable pulse transmission line 16.1, and in parallel therewith to a receiver input stage 18 over another pulse transmission line 16.2. The transducer 12 is connected via line 17.1 to an echo amplifier 17 which in turn is connected to the receiver input stage 18 over line 17.2. This system operates in a known fashion, briefly described as follows. The generator 16, when suitably triggered, either internally by itself or by external trigger means not shown, provides a driving pulse of electric wave energy to the transducer 12 and a time reference pulse to the receiver input stage 18. The transducer 12 initiates a corresponding elastic wave pulse in the wave conductor 10, which pulse travels along the wave conductor towards the other end thereof. At the surface S—S (FIG. 1) partial reflection of the elastic wave pulse takes place and the echo returns to the transducer 12, where it generates a corresponding electric pulse signal. This signal is amplified by the amplifier 17 and fed to the receiver input stage 18. Thereafter, time measuring, indicating or other utilization circuits, as desired, present or make use of the information contained in the time reference pulse from the generator 16 and the echo pulse from the amplifier 17. For example, a cathode ray tube type presentation 19 can be used, in which the time reference pulse 19.1 appears first, at the left, and the main frequency component 19.2 of the received echo appears furthest to the right. Secondary frequency components 19.21 and 19.22 of lower amplitude arrive first and appear to the left of the main frequency component 19.2. Obviously, the novel wave conductor and transducer combination of the invention can be used in other echo-ranging systems, and the system shown in FIG. 4 is exemplary only. Use of the invention will improve the performance of any echo-ranging system, giving stronger echoes by increasing the target strength of the liquid, and will provide increased accuracy of measurement by reducing the phase velocity of the elastic waves propagating in the wave conductor and simultaneously making it possible to reduce the number of stress cycles per pulse (i.e., to use shorter pulses) to review but a few of the advantages of the invention. Because of its simple mechanical structure, involving only that a cylindrical shell or tube, which can be made of metal and endowed with great rigidity and can be immersed in the liquid or liquids being supervised, the invention is useful with explosive, inflammable liquid hydrogen and liquid oxygen; no electrical parts need be brought into contact with the fluid under supervision. Furthermore, no unusual mounting or supporting problem is presented.

The invention can be practiced with a single wave conductor as shown in FIGS. 1 to 4, inclusive, or with two wave conductors, one for sending and one for receiving. In the latter case, a transmitted pulse will be sent along one wave conductor to the liquid surface or interface being supervised, and pulse energy transmitted through the liquid from one wave conductor to the other will be used instead of energy reflected in a single wave conductor. FIG. 6 illustrates such a two-conductor embodiment in which a first tubular wave conductor 10.11 of mean diameter $D_2$ coaxially surrounds a second tubular wave conductor 10.2 of mean diameter $D_1$. A first ring-shaped transducer 12.1 is fitted to the outside of the first wave conductor at one end thereof, and a second ring-shaped transducer 13.1 is fitted to the inside of the second wave conductor at the corresponding end thereof. The wave conductors are adapted to penetrate the surface S—S, as in FIG. 1, and it is essential only that the liquid (not shown) occupy the tubular space between the wave conductors. The arrangement of FIG. 6 may be connected in a circuit like that of FIG. 4 by connecting the pulse generator transmission line 16.1 to the first transducer 12.1 and the receiver transmission line 17.1 to the second transducer 13.1, in place of the common transducer 12 of FIG. 4.

Considering that $D_1$ and $D_2$ are necessarily not identical, and that the mean diameter determines the frequency of ring mode resonance of each wave conductor (Relation 1), it is preferred in FIG. 6 to choose diameters $D_1$ and $D_2$ sufficiently large so that the ratio of their magnitudes is as nearly unity as is convenient. For example a ratio $$\frac{D_2}{D_1} = \frac{1.5}{1.4}$$

is satisfactory. Then, taking into account that with a preferred wave conductor material such as aluminum (or steel) ring mode resonance with a barium titanate ring transducer is more easily achieved if the transducer is inside the wave conductor tube, rather than outside, the receiver transducer 13.1 is disposed inside the second wave conductor 10.2. Since the first wave conductor 10.11 is the "transmitter" or driven wave conductor, the diameter $D_1$ is preferably chosen to satisfy more nearly the conditions of Relation 1 for the desired frequency of operation, in order to provide the greatest possible sensitivity to the receiver. It will be noted that in FIG. 5, the dispersion curve 20 is somewhat flattened in the vicinity of the ring mode resonance frequency so that if the ratio $D_2/D_1$ approaches unity as mentioned above an operative system can be achieved.

The conditions for resonance between the transducer and the wave conductor can be satisfied for both the transmitter and the receiver simultaneously as shown in FIG. 7, where the transmitting transducer 12.11 is also within the first wave conductor 10.11. In this case due allowance will have to be made, in the measuring process, for the difference in the lengths of the two wave conductors. This is a fixed difference and compensation for it can be made by those skilled in the art to which the invention relates.

Obviously, if the two wave conductors are not telescopically fitted one within the other, but are disposed side by side, for example, they can be made of the same mean diameter.

The embodiments of the invention which have been illustated and described herein are but a few illustrations of the invention. Other embodiments and modifications will occur to those skilled in the art. For example, while Relations 1, 2 and 3 assume very thin shells 10, if the ratio $t/D$ is not very small the invention is nevertheless operative but larger values of $C_z$ will be achieved. No attempt has been made to illustrate all possible embodiments of the invention but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

As used in the claims, the term "liquid surface" includes the interface between two liquids, as well as the interface between a liquid and a gas.

What is claimed is:

1. In a system for echo ranging from a reference region to a liquid surface, first and second elongated tubular conductors of elastic wave energy disposed to extend from said reference region through said surface, means acoustically coupled to said first conductor to establish elastic wave vibrations therein in a radial mode having axial symmetry and propagating axially along said conductor between said reference point and said surface, and electromechanical transducer means acoustically coupled to said second conductor adapted to respond to similar vibrations propagating in said second conductor, the ratio $t/D$ between the maximum wall thickness "$t$" and the mean diameter "$D$" of each conductor being of the order of 5 percent.

2. System according to claim 1 in which one of said wave conductors has an internal diameter larger than the external diameter of the other, and the smaller is telescopically disposed within and spaced from the larger, the ratio of the larger mean diameter to the smaller mean diameter being approximately $$\frac{1.5}{1.4}$$

3. In combination, a container for a liquid, said container having a horizontal cross section which is non-uniform with respect to vertical position in said container, an elongated tubular conductor of elastic wave energy disposed to extend from a reference point substantially vertically to a region near the bottom of said container, and means acoustically coupled to said conductor to establish elastic wave vibrations therein in a radial mode having axial symmetry and propagating axially along said conductor between said reference point and said region, the ratio $t/D$ between the maximum wall thickness "$t$" and the mean diameter "$D$" of said conductor being of the order of 5 percent, the wall thickness "$t$" of said conductor being varied with respect to axial position therein to provide thinner conductor wall sections in regions of larger horizontal cross section of said container so that equal times of propagation of said waves therein will correspond to equal cross-sectional volumes of said container.

4. In combination, a container for a liquid, said container having a horizontal cross section which is non-uniform with respect to vertical position in said container, an elongated tubular conductor of elastic wave energy disposed to extend from a reference point substantially vertically to a region near the bottom of said container, and means acoustically coupled to said conductor to establish elastic wave vibrations therein in a radial mode having axial symmetry and propagating axially along said conductor between said reference point and said region, the ratio $t/D$ between the maximum wall thickness "$t$" and the mean diameter "$D$" of said conductor being of the order of 5 percent, the wall thickness of said conductor being varied with respect to axial position therein substantially according to the relation:

$$\frac{C_z}{C_0} = \frac{1.074}{(1-\nu^2)^{1/4}} \sqrt{\frac{t}{D}}$$

where:

$C_z$ is the phase velocity of said radial mode vibrations in said conductor in the axial direction;

$C_0$ is the bar velocity at which compressional waves propagate in said conductor in the axial direction;

$\nu$ is Poisson's ratio for the material of said conductor;

$t$ is said wall thickness of said conductor; and $D$ is the mean diameter of said conductor; and "$t$"«"$D$"; to provide thinner conductor wall sections in regions of larger horizontal cross section of said container so that equal times of propagation of said radial mode waves therein will correspond to equal cross-sectional volumes of said container.

References Cited in the file of this patent

UNITED STATES PATENTS

| | | |
|---|---|---|
| 2,626,992 | Holman | Jan. 27, 1953 |
| 2,713,263 | Turner | July 19, 1955 |
| 2,753,542 | Rod et al. | July 3, 1956 |
| 2,849,882 | Lee | Sept. 2, 1958 |

FOREIGN PATENTS

| | | |
|---|---|---|
| 663,946 | Great Britain | Jan. 2, 1952 |
| 7,999 | Great Britain | Jan. 6, 1910 |